Nov. 15, 1955  A. J. WILLIAMS, JR., ET AL  2,724,022
FAST-ACTING FEEDBACK AMPLIFIERS FOR HIGH IMPEDANCE SOURCES
Filed Feb. 7, 1950  2 Sheets-Sheet 1
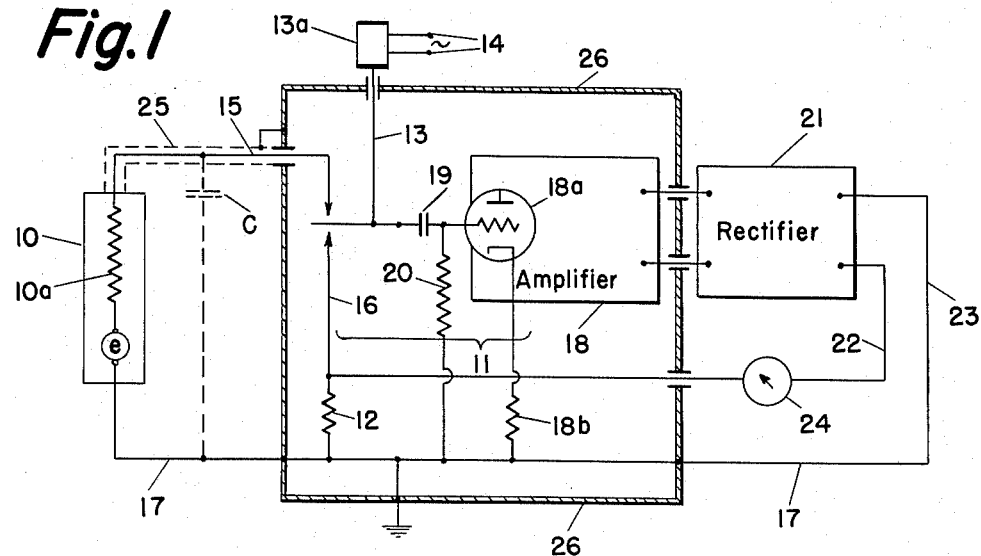
*Fig. 1*
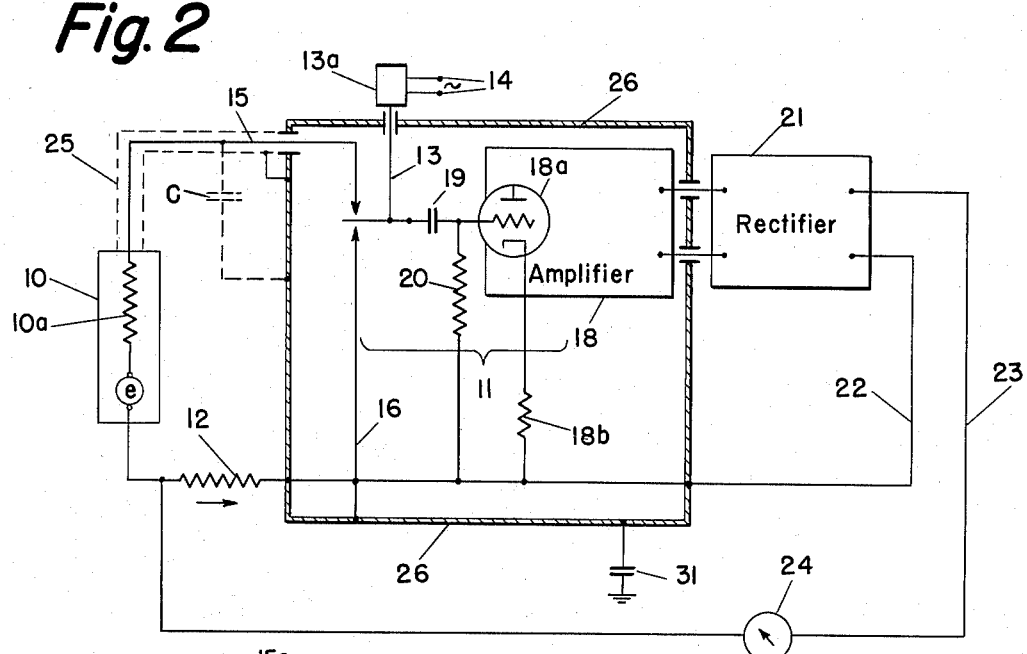
*Fig. 2*
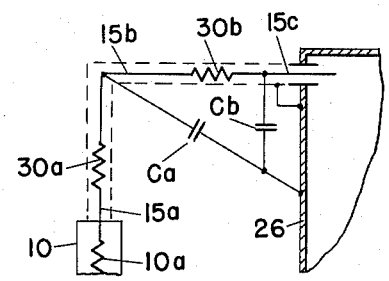
*Fig. 2-A*
INVENTORS
ALBERT J. WILLIAMS, JR.
WILLIAM RUSSELL CLARK
BY WILL McADAM
*Woolrock and Phelan*
ATTORNEYS

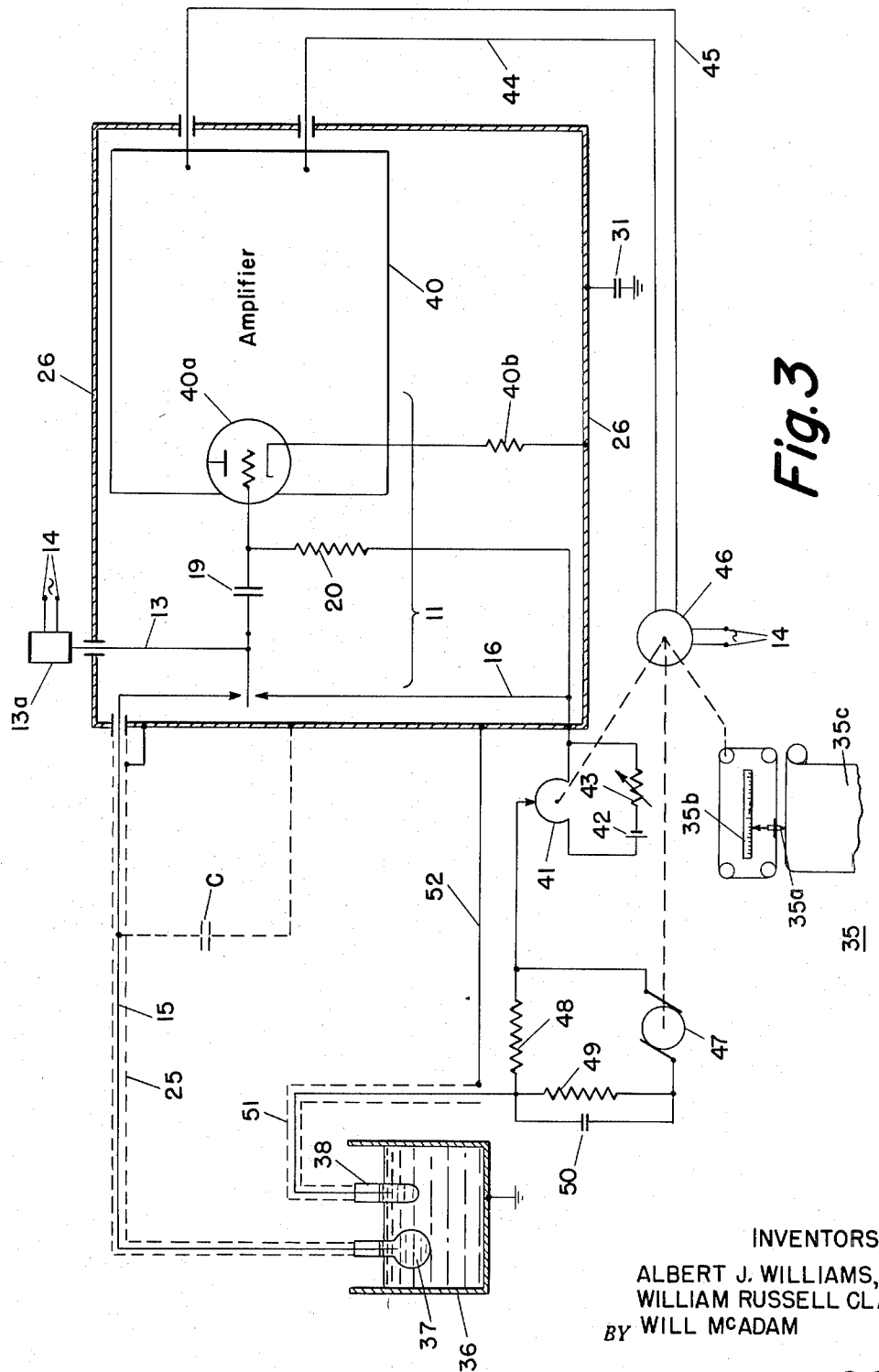

United States Patent Office 2,724,022
Patented Nov. 15, 1955

2,724,022

FAST-ACTING FEEDBACK AMPLIFIERS FOR HIGH IMPEDANCE SOURCES

Albert J. Williams, Jr., Philadelphia, William Russell Clark, Jenkintown, and Will McAdam, Ambler, Pa., assignors to Leeds and Northrup Company, Philadelphia, Pa., a corporation of Pennsylvania Application February 7, 1950, Serial No. 142,814

4 Claims. (Cl. 179—171)

This invention relates to measuring systems of the self-balancing type, more particularly, to systems suitable for the measurement of voltages developed within high impedance sources or across a high impedance and has for an object the provision of circuit connections by means of which there are avoided deleterious effects upon the operation of the measuring system arising from unavoidable capacitance inherently present among the conducting elements of the measuring system.

It is conventional practice to connect one side of the input circuit of a converter-amplifier to the high impedance source of voltage which is to be measured. Due to the need of avoiding spurious signals due to the presence of stray fields, good shielding is provided on said side of the input circuit. However, the presence of such shielding inherently produces unavoidable capacitance between the one side of the input circuit and the shield. Such capacitance is effectively connected across the high impedance source since the other side of said input circuit and the other side of said source are connected to the chassis of the amplifier which is also connected to the shield of the input circuit. Accordingly, the appearance at the amplifier of a change in voltage of the source is delayed by the unavoidable capacitance of the input circuit. In the past, a balancing voltage has been introduced into the amplifier input circuit in a mesh of that circuit which excludes any delay effect by said capacitance.

In accordance with the present invention, means responsive to the output of the converter-amplifier including a resistor in series with the high impedance source is utilized to develop a voltage to oppose and balance that developed by said source, said resistor being included in a mesh of the circuit which also includes the high impedance source and the unavoidable capacitance between the input circuit and the shield thereof. Inclusion of the resistor in this mesh is accomplished by connecting one side of that resistor to the chassis and shield and by connecting the other side to the unshielded side of the source. Accordingly, that resistor is included in a mesh of the network including the high impedance source and is excluded from another mesh of the network which may also include said unavoidable capacitance but which does not include the high impedance source. Accordingly, any effect of the unavoidable capacitance which is thereby effectively connected across the input of the converter-amplifier is to delay equally the transmission to the amplifier of a change of voltage of the source and of a change in the balancing voltage developed across said resistor.

For a more detailed description of the invention and for a discussion of the investigation and theory underlying the present invention, reference is to be had to the following description taken in conjunction with the accompanying drawings, in which:

Fig. 1 is a wiring diagram of the essential elements of a system of the type which formed the basis for the present invention;

Fig. 2 is a wiring diagram showing the essential arrangement of an embodiment of the invention;

Fig. 2-A is a fractional part of the wiring diagram of Fig. 2 including a preferred modification of the invention; and Fig. 3 is a further wiring diagram of an additional modification of the invention.

For ease in understanding the present invention, reference will first be made to Fig. 1, in connection with which there will be presented the nature of the problem for which the present invention represents a satisfactory solution. Fig. 1 may be taken as representative of self-balancing measuring systems of the type in which a source 10 of unknown voltage is connected to the input circuit of a converter-amplifier 11, the output of which is utilized to develop across resistor 12 a voltage of opposite polarity but substantially equal to that developed by the source 10.

More particularly, in Fig. 1, a vibrator 13 having its operating coil 13a connected to suitable alternating current supply lines 14 of any suitable frequency such, for example, as 60 cycles, serves first to connect to capacitor 19 conductor 15 forming one side of the input circuit of the converter-amplifier 11 from the source 10, and then to connect capacitor 19 to the conductor 16. As shown, the latter connection includes the feedback resistor 12 and a conductor 17. If the voltage developed across the feedback resistor 12 is greater or less than that developed by the source 10, an alternating voltage of one phase or the other is applied to the grid of a vacuum tube 18a through a filter, one section of which is illustrated as including the capacitor 19 and a resistor 20. The vacuum tube 18a has been illustrated as forming the first stage of the amplifier 18, having a cathode resistor 18b, and it is to be understood the amplifier will ordinarily be provided with additional stages of amplification including power output tubes. The amplifier 18 may include a rectifier or, as illustrated, a separate rectifier 21 may be provided to produce in conductors 22 and 23 a current which changes with change in the unbalance voltage applied to the input circuit and of magnitude which will develop across resistor 12 a voltage drop substantially equal and opposite to that of the source 10. Accordingly, a meter 24 may be calibrated in terms of voltage of source 10.

Systems of the foregoing type have proven quite satisfactory for rapid and accurate measurement of the voltage of thermocouples and the like. However, where the impedance of the unknown source of voltage 10 has been high, as in the case of pH measurement with glass electrodes, the time of measurement of a change in the voltage from such a source has been found greatly to exceed what one would expect based upon the simple theory of the measuring system. As a result of experimental and analytical study of the causes of the delayed measurement, the following explanation may be presented.

Because of the presence of shield 25 surrounding input conductor 15, as from the source 10, and connected, as shown, to the chassis and metallic enclosure 26 of the converter-amplifier, there will be developed capacitance between conductor 15 and the chassis which may in Fig. 1 also be considered to be ground. Accordingly, the capacitor C represents the total of the capacitance of the lead 15 from the source and also the filtering capacitance where a filter is included in the circuit with input conductor 15. The capacitor C also includes the capacitance between the upper stationary contact of vibrator 13 and the chassis, or ground. Though the total capacitance is of a relatively low order, for example, as from several micromicrofarads to several thousand micromicrofarads, it becomes important where the impedance of the voltage source is high, as it is in the case of the glass electrodes in pH measurement, as of the order of 10 megohms to 1,000 megohms, or more. A sudden change of voltage $e$ of the source 10, which has been illustrated as including a high internal resistance represented by the resistor 10a, produces an exponential change of voltage at the upper stationary contact of vibrator 13. The voltage input to vibrator 13 changes exponentially inasmuch as the rise of voltage at the vibrator 13 depends upon the time required to charge the capacitor C through the high impedance circuit. The charging time may vary from several seconds to as long as several minutes. Accordingly, the meter 24 will not promptly indicate the entire change in voltage of source 10. It will not measure the change until after the lapse of the aforesaid time interval.

It has heretofore been proposed to delay the application of the feedback voltage to the circuit including the contacts of vibrator 13 in order that the meter 24 shall promptly respond to the full change of voltage of source 10. However, the introduction of such a delay circuit necessarily requires a time constant in the feedback circuit substantially equal to that of the input circuit from the source 10. Such a design may be provided where the impedance of source 10 remains substantially constant, but with any change of impedance of source 10 the time delay of the input circuit changes and there immediately arises a problem. The system including the meter 24 no longer is capable of prompt indication of the full change of voltage of source 10.

In carrying out the present invention in acordance with the embodiment of Fig. 2, there is avoided the need of providing a specially designed delay circuit in a mesh which only includes the feedback connections and which does not include the voltage source. Nevertheless, the measuring system including the meter 24 is effective at all times promptly to indicate the entire extent of changes of voltage in the source 10. Direct comparison of the systems of Figs. 1 and 2 may be had since like reference characters have been utilized for like parts. More particularly, the feedback resistor 12 is included in a mesh of the measuring system which may be traced from the chassis and back again by way of feedback resistor 12, source 10, input conductor 15, and either by way of capacitor C or by way of the capacitance between the fixed contacts of vibrator 13 and the chassis. Thus, the resistor 12 has been moved into a mesh of the measuring network which electrically is quite different from the mesh in which it is located in Fig. 1. In the latter the resistor 12 is connected in a mesh completed by capacitor C and by the input to the converter-amplifier 11. Conductors 15 and 16 form the two input connections to the converter-amplifier since any difference in potential between them will result in an alternating potential across resistor 20 and an alternating potential on the grid of input tube 18a.

In contrast, in Fig. 2 the resistor 12 is connected in a mesh completed by source 10 and capacitor C. The feedback voltage across resistor 12 and the unknown voltage of source 10 are in the same mesh. As a result of the circuit arrangement of Fig. 2, any delay imposed upon the transmission of the unknown voltage of source 10 to the converter-amplifier input is likewise imposed upon the transmission of the feedback voltage to the converter-amplifier input and this equality is not destroyed by change in resistance of the source 10. If the feedback voltage across resistor 12 of Fig. 2 could be made to change in increments which are exactly equal, opposite, and simultaneous with incremental changes in the source voltage 10, then the voltage across the input circuit of the converter-amplifier would be maintained at zero. In practice, it has been found that the converter-amplifier 11 with adequate gain, within the range of $10^2$ to $10^9$, modifies the feedback voltage in an effort to minimize the amplifier input signal with the result that the feedback voltage follows with very little delay abrupt changes in the source voltage. The gain will in each case be adequate to make the error voltage; that is, the voltage applied at the input contacts of the converter necessary to maintain the required feedback voltage a small fraction of the voltage of source 10.

The improved performance is not only secured, but it is maintained, with a delay of only a second or so notwithstanding an increase of resistance of the source 10 which may be as great as from 0 ohm to 100 megohms, and above. The foregoing reference to a delay of a second or so is to be compared with the inherent delay due to the circuit parameters, particularly the feedback circuit, which of themselves impose the delay of a second or so which is in contrast with the delay of a system such as Fig. 1 with the same circuit parameters of the order of ten seconds, the latter delay being due to the mesh of Fig. 1 including resistor 12 and capacitor C, and excluding the source 10 where the capacitor had a value of the order of 1000 micromicrofarads and the source 10 had an internal impedance of 1000 megohms.

As further indicated in Fig. 2, the chassis and shield may be connected to ground through a capacitor 31. Since the source 10 and the feedback resistor 12 are connected in the same mesh or series-circuit, any delaying effect due to capacitance represented by capacitor C will be the same for the feedback resistor 12 as for the source 10 since the high impedance 10a of source 10 is common to both voltage sources 10 and 12.

Fig. 2–A is similar to Fig. 2 except for the modification of the input circuit including conductor 15. Resistors 30a and 30b have been added in series in the input circuit as between conductors 15a, 15b and 15c. These resistors effectively divide the inherent unavoidable capacitance into two sections which have been represented by the capacitors Ca and Cb. This subdivision will be apparent by considering in Fig. 2–A both resistors as having exceedingly low values, as for example zero, in which case capacitors Ca and Cb would be reunited. It has been found desirable for some operating conditions to omit resistor 30b, or to reduce its value to zero, but to include a fixed resistor 30a having a value less than the maximum value of the resistance of the source 10.

In one embodiment of the invention the maximum value of the resistance of the source, pH electrodes, was 1000 megohms and the value of resistor 30a was 500 megohms. One advantage resulting from the use of the resistor 30a was the retention of the filtering action thereby attained for the input to the converter-amplifier under those conditions where the resistance of the source 10 assumed a low value. Thus, the converter-amplifier was protected from disturbances of foreign origin which might otherwise have affected it due to possible imperfections in the shielding of the source. Some sources, such as pH electrodes, are in use which are inadequately shielded. A second advantage resulting from the inclusion of resistor 30a in the input circuit is the avoidance of oscillation resulting from lack of attenuation at certain critical frequencies in the feedback circuit with low values of resistance of source 10.

If resistor 30a is now assumed to be zero and resistor 30b large, there will be an added advantage in that the filtering provided will protect the converter-amplifier not only from disturbances due to pickup at the source 10 but also any disturbances that might arise due to imperfections in the shielding of the leads 15a, 15b.

Under certain other operating conditions it has been found desirable to use both of resistors 30a and 30b located as shown in Fig. 2–A. When both resistors are used, they may have resistance values each of which will be less than the maximum resistance of the source 10, the sum of the resistance values of both, ordinarily being but not necessarily, less than the maximum resistance of source 10.

With the foregoing understanding of the invention, it is to be understood that further modifications may be made within the scope of the appended claims. More particularly, that the invention has been applied to measuring systems of widely differing character. In the system of Fig. 2 the rectifier 21 may be of the synchronous type operating synchronously with the vibrator 13 or it may be non-synchronous. Rectifier 21 need not be included in the output circuit of the amplifier where a system such as disclosed in Fig. 3 is utilized.

In Fig. 3 the invention has been illustrated as applied to an indicating and recording instrument 35 of the high-speed type in which a combined pen and index 35a is movable relative to a scale 35b and a chart 35c to indicate on the scale and record on the chart the change in pH of a solution within a container 36. The input conductor 15 is connected to the measuring electrode 37, the other side of the input circuit being connected to the reference electrode 38. As is well understood by those skilled in the art, the impedance of the voltage source comprising the measuring electrode and the reference electrode is quite high, as from 10 megohms to 1000 megohms, or more. Moreover, where the liquid in the container 36 is continuously flowing therethrough or is supplied to and taken therefrom by conductive pipes, the container and the liquid therein will be at ground potential.

In accordance with the invention the feedback resistor and the other connections are disposed similarly to the modification of Fig. 2 in which the vibrator or converter 13 is of the single-pole, double-throw type, the single pole or contact thereof being relatively movable with respect to a pair of poles or contacts. More particularly, the lower stationary contact of vibrator 13 is connected by conductor 16 to the chassis of the amplifier and its conductive walls which form a shield therefor, while the other stationary contact is connected to the input conductor 15. Thus, a stray capacitance between the input conductor 15 and its shield 25 is effectively connected across the input circuit of the converter-amplifier 11 as indicated by the capacitor C. The movable contact of the vibrator is connected directly to the capacitor 19 in the input circuit to the tube 40a.

In Fig. 3 the amplifier 40 may be of the type disclosed in Williams Patent 2,113,164, one of the amplifying tubes 40a being diagrammatically illustrated. As in the modification of Fig. 2, the difference between the voltage developed between electrodes 37 and 38 and the voltage across a fractional part of a slidewire or variable resistor 41 is applied to the input circuit of the amplifier 40 including capacitor 19 and resistor 20. A battery 42 and a variable resistor 43 is connected in series with the slidewire 41. The amplifier 40 produces an output applied by way of conductors 44 and 45 to a control winding of a motor 46, having a power winding preferably connected to the alternating current supply lines 14. The motor 46 rotates in one direction or the other, depending upon the polarity of the input signal to the amplifier and serves to drive the slidewire 41 in a direction to decrease the unbalance or error voltage applied to the input circuit of the amplifier.

For high-speed operation and to prevent under-damping or over-damping there is also provided a tachometer illustrated in the form of a small generator 47 driven by motor 46 and connected in shunt with a resistor 48 in series-circuit relation with the slidewire 41 in the input circuit of the amplifier 40. A resistor 49 with shunting capacitor 50 is connected in series-circuit relation with resistor 48 and generator 47. The tachometer-generator is so connected with respect to the resistor 48 that it produces in the input circuit of amplifier 40 a voltage which is in the direction to decrease the unbalance voltage, and the magnitude of the voltage introduced by resistor 48 will be substantially proportional to the speed of rotation of motor 46. As explained in Williams Patent 2,113,436, the resistor 49 and capacitor 50 are effective to introduce into the input circuit a component of voltage proportional to the acceleration of motor 46, thus further assisting in rapidly rebalancing the measuring network without over-adjustment or under-adjustment of slidewire 41.

It is to be understood that that part of the input circuit which may be traced from the reference electrode 38 by way of resistor 48 and slidewire 41 is of relatively low impedance. Accordingly, the chassis and shield may not be conductively connected to ground, though an alternating current ground may be provided by the capacitor 31. Since the container 36 is grounded, the connection of the chassis of the amplifier to ground would short-circuit or bypass resistors 41 and 48, thus rendering them ineffective. In some cases it will be desirable to provide a shield 51 for the conductor extending from the reference electrode 38. This shield may be connected by conductor 52 to the chassis and conducting case or housing of the amplifier, the capacity to this shield having no appreciable effect in the delay previously considered because of the low resistance of resistors 48 and 41.

Other forms of tachometer damping may be utilized, such as R–C networks which in conjunction with slidewire 41 or a separate slidewire will be effective to introduce into the network a voltage or voltages proportional to speed and/or acceleration of the movement of slidewire 41, such arrangements being known to those skilled in the art, a number of examples of which are disclosed in the following publications: A. I. E. E. Transactions, vol 57, 1938, pages 565–568, an article entitled "Thyratron and tachometer speed control of small motors" by A. J. Williams, Jr., and A. I. E. E. Transactions, vol. 65, 1946, pages 205–208, an article entitled "Electronically balanced recorder for flight testing and spectroscopy" by A. J. Williams, Jr., et al.

In the foregoing description and in the claims, the term "chassis" is to be taken as the conductive part of the amplifier represented by one side of the capacitor C, the conductor 15 representing the other side thereof, and in general will include the conductive housing provided for the converter-amplifier 11.

In the claims the reference to "feedback means" is to be taken to include the resistor 12 of Fig. 2 and the slidewire resistor 41 of Fig. 3, these being respectively utilized to introduce into the circuit in series with the source of voltage, a voltage which reduces substantially to zero the signal voltage applied to the input terminals of the converter-amplifier, the output appearing at the output terminals of the amplifier being effective in both the modifications of Figs. 2 and 3 to achieve the same end result.

What is claimed is:

1. A self-balancing system for the measurement of a voltage developed in a high impedance source, comprising an amplifier having a chassis, an output circuit and a grid-cathode input circuit, a converter of the single-pole, double-throw type having a pair of poles, said single pole and said pair of poles being relatively movable between two circuit-closing positions, a capacitor connected between said single pole and the grid of said input circuit, a conductor connecting one of said pairs of poles directly to said chassis, a feedback resistor having one end thereof connected directly to said chassis and the other end thereof connected to one side of the high impedance source, a shielded conductor connected at one end to the other of said pairs of poles and at its opposite end to the opposite end of the high impedance source, a circuit connection from the cathode of said input circuit to said chassis, circuit means connected to said output circuit of said amplifier for flow of current through said feedback resistor in a direction to develop a voltage in opposition to that produced by the high impedance source, and means responsive to current flow in said feedback circuit for indicating the magnitude of the voltage developed by the high impedance source.

2. A self-balancing system for the measurement of a voltage developed in a high impedance source, comprising an amplifier having a chassis, an output circuit and a grid-cathode input circuit, a converter of the single-pole, double-throw type having a pair of poles, said single pole and said pair of poles being relatively movable between two circuit-closing positions, a capacitor connected between said single pole and the grid of said input circuit, a conductor connecting one of said pairs of poles directly to said chassis, a feedback resistor having one end thereof connected directly to said chassis and the other end thereof connected to one side of the high impedance source, a shielded conductor connected at one end to the other of said pairs of poles and at its opposite end to the opposite end of the high impedance source, a circuit connection from the cathode of said input circuit to said chassis, circuit means connected to said output circuit of said amplifier for flow of current through said feedback resistor in a direction to develop a voltage in opposition to that produced by the high impedance source, means responsive to current flow in said feedback circuit for indicating the magnitude of the voltage developed by the high impedance source, and an electrical connection directly connecting said shield to said chassis effectively to connect the capacity between said shielded conductor and its shield across said pair of poles and excluding therefrom said feedback resistor.

3. The combination set forth in claim 2 in which there is included a resistor in series-circuit relation in said shielded conductor between said high impedance source and said amplifier.

4. The combination set forth in claim 2 in which there are included in series-circuit relation with said shielded conductor and between said high impedance source and said amplifier two resistors respectively spaced one from the other, one of them being at the end of said shielded conductor terminating at the high impedance source and the other at the end of the shielded conductor terminating at said converter thereby to divide between them the distributed capacitance developed by the length of said shielded portion of said shielded conductor extending between them.

References Cited in the file of this patent

UNITED STATES PATENTS

| | | |
|---|---|---|
| 2,232,211 | Cary | Feb. 18, 1941 |
| 2,281,312 | Krist | Apr. 28, 1942 |
| 2,282,319 | Brown | May 12, 1942 |
| 2,285,482 | Wunsch | June 9, 1942 |
| 2,311,977 | Coleman | Feb. 23, 1943 |
| 2,367,746 | Williams | Jan. 23, 1945 |
| 2,372,062 | Dorsman | Mar. 20, 1945 |
| 2,458,632 | Parsons | Jan. 11, 1949 |
| 2,459,730 | Williams | Jan. 18, 1949 |
| 2,489,272 | Daniels | Nov. 29, 1949 |
| 2,490,579 | Clewell | Dec. 6, 1949 |
| 2,497,129 | Liston | Feb. 14, 1950 |
| 2,563,062 | Perley | Aug. 7, 1951 |
| 2,622,192 | Tarpley | Dec. 16, 1952 |